(12) United States Patent
Furlan

(10) Patent No.: US 9,037,766 B2
(45) Date of Patent: May 19, 2015

(54) PIN SELECTABLE I2C SLAVE ADDRESSES

(71) Applicant: Fairchild Semiconductor Corporation, San Jose, CA (US)

(72) Inventor: Igor Furlan, Sunnyvale, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 245 days.

(21) Appl. No.: 13/679,465

(22) Filed: Nov. 16, 2012

(65) Prior Publication Data

US 2013/0132626 A1    May 23, 2013

Related U.S. Application Data

(60) Provisional application No. 61/561,462, filed on Nov. 18, 2011.

(51) Int. Cl.
*G06F 9/06* (2006.01)
*G06F 13/36* (2006.01)

(52) U.S. Cl.
CPC ..................... *G06F 13/36* (2013.01)

(58) Field of Classification Search
CPC .... G06F 12/0646–12/0676; G06F 2213/0016; G06F 12/0669; G06F 13/36; G06F 2213/0052
USPC .......................... 710/8–9, 104, 110
See application file for complete search history.

(56) References Cited

U.S. PATENT DOCUMENTS

| | | | |
|---|---|---|---|
| 6,255,973 B1 * | 7/2001 | Smith et al. | 341/141 |
| 6,823,400 B2 * | 11/2004 | Namba | 710/9 |
| 7,239,251 B2 * | 7/2007 | Dwelley et al. | 340/870.21 |
| 7,484,027 B1 | 1/2009 | Dahlin | |
| 7,788,431 B2 * | 8/2010 | Deshpande et al. | 710/110 |
| 7,827,330 B2 * | 11/2010 | Richards et al. | 710/69 |
| 7,962,662 B2 * | 6/2011 | Richards et al. | 710/9 |
| 7,979,597 B2 * | 7/2011 | Deshpande et al. | 710/14 |
| 8,040,215 B2 * | 10/2011 | Zakriti | 340/4.21 |
| 8,205,017 B2 * | 6/2012 | Parr et al. | 710/9 |
| 8,225,021 B2 * | 7/2012 | Adkins et al. | 710/110 |
| 8,386,657 B2 * | 2/2013 | Adkins et al. | 710/9 |
| 8,478,917 B2 * | 7/2013 | Scott et al. | 710/104 |

(Continued)

OTHER PUBLICATIONS

"Linear Technology LTC2309, 8-Channel, 12-Bit SAR ADC with I2C Interface", Linear Technology Corporation, (2008), 26 pgs.

(Continued)

*Primary Examiner* — Ryan Stiglic
(74) *Attorney, Agent, or Firm* — Schwegman Lundberg & Woessner, P.A.

(57) ABSTRACT

This document discusses, among other things, a multi-address Inter-Integrated Circuit (I²C) selection circuit configured to receive a number (N) of identification (ID) signals from a corresponding number (N) of ID pins of a slave I²C device and at least one of a data signal from a serial data line (SDA) of an I²C bus or a clock signal from a serial clock line (SCL) of the I²C bus, and to determine one of 4 to the power of N ($4^N$) selectable I²C addresses using the number (N) of ID signals and at least one of the data signal or the clock signal. In an example, the multi-address I²C selection circuit can determine 4 selectable I²C addresses using a single ID signal from a single ID pin of the slave I²C device.

13 Claims, 10 Drawing Sheets

(56) References Cited

U.S. PATENT DOCUMENTS

| | | | |
|---|---|---|---|
| 8,806,083 B2* | 8/2014 | Doorenbos | 710/30 |
| 2001/0029554 A1* | 10/2001 | Namba | 710/9 |
| 2006/0282592 A1* | 12/2006 | Zakriti | 710/300 |
| 2008/0147941 A1* | 6/2008 | Deshpande et al. | 710/110 |
| 2008/0195764 A1* | 8/2008 | Deshpande et al. | 710/8 |
| 2008/0288662 A1* | 11/2008 | Doorenbos | 710/4 |
| 2009/0031048 A1* | 1/2009 | Richards et al. | 710/3 |
| 2010/0185784 A1* | 7/2010 | De Nie et al. | 710/9 |
| 2010/0306431 A1* | 12/2010 | Adkins et al. | 710/110 |
| 2011/0022878 A1* | 1/2011 | Richards et al. | 713/600 |
| 2012/0079151 A1* | 3/2012 | Tailliet et al. | 710/110 |
| 2012/0284429 A1* | 11/2012 | Adkins et al. | 710/3 |
| 2013/0054933 A1* | 2/2013 | Fister et al. | 711/203 |

OTHER PUBLICATIONS

MAXIM, "18-Port GPIO with LED Intensity Control, Interrupt, and Hot-Insertion Protection", (2005), 25 pgs.

* cited by examiner

US 9,037,766 B2

PIN SELECTABLE I2C SLAVE ADDRESSES

CLAIM OF PRIORITY

This application claims the benefit of priority under 35 U.S.C. §119(e) of Igor Furlan, U.S. Provisional Patent Application Ser. No. 61/561,462, entitled "FOUR I2C SLAVE ADDRESSES SELECTABLE WITH ONE PIN," filed on Nov. 18, 2011, which is incorporated by reference herein in its entirety.

BACKGROUND

Inter-Integrated Circuit ($I^2C$) is a multi-master single-ended two-wire communication interface configured to transmit or receive information serially from an $I^2C$ master device to an $I^2C$ slave device using a bus including a serial data line (SDA) and a serial clock line (SCL). $I^2C$ master devices can include a microcontroller (μC) or other electronic device configured to issue a clock and address slave devices and $I^2C$ slave devices can include peripheral devices, such as an analog-to-digital controller (ADC), a digital-to-analog controller (DAC), or one or more other peripheral devices configured to receive a clock and address.

FIG. 1 illustrates generally an example Inter-Integrated Circuit ($I^2C$) system 100 including an $I^2C$ master device 105, an $I^2C$ slave device 110, and pull-up resistors 111, 112 configured to pull a serial data line (SDA) and a serial clock line (SCL) of a bus, respectively, to a source voltage (VDD).

FIG. 2 illustrates generally an example Inter-Integrated Circuit ($I^2C$) transaction sequence 200 including a start bit 115, initialization bits 116, data bits 117, and a stop bit 118 on clock and data lines (SCL, SDA, respectively). Start and stop bits 115, 118 are unique signals that can be generated by an $I^2C$ master device, and are defined as rising or falling edges on the serial data line (SDA) while the serial clock line (SCL) is kept high, as illustrated in the transaction sequence 200.

An $I^2C$ master device can send a start bit 115 (e.g., a falling edge on SDA as SCL is kept high) on a two-wire bus that can be received by an $I^2C$ slave device. Reception of the start bit 115 by an $I^2C$ slave device can reset the $I^2C$ slave device internal bus logic. After sending the start bit 115, the $I^2C$ master device can send initialization bits 116, including an address sequence, and can wait for an acknowledge from an $I^2C$ slave device having a matching internal address sequence. If the address sequence is acknowledged, the $I^2C$ master device can send or read data bits 117 and wait for an acknowledge (ACK) from the $I^2C$ slave. The $I^2C$ master device can complete the data transfer by generating a stop bit 118 (e.g., a rising edge on SDA as SCL is kept high). In an example, each device on an $I^2C$ system can have a unique address (e.g., an $I^2C$ slave ID), enabling several devices (e.g., $I^2C$ slave devices, etc.) to coexist on the same two-wire bus using the different addresses.

For some devices, the unique address can be defined using one or more pins. For example, using traditional addressing techniques, two unique addresses can be selected using a single pin, four unique addresses can be selected using two pins, etc. However, in certain examples, multiple $I^2C$ chips of the same type can be used in a single application (e.g., two or more of the same type of digital-to-analog converters, two or more of the same type of analog-to-digital converters, etc.). If the existing $I^2C$ system requires more than two unique addresses, one pin may not be enough to separate the address space. One solution is to increase the number of address pins on the $I^2C$ device. However, increasing the number of pins on an integrated circuit (IC) can be expensive (e.g., increasing the size of the chip, the size of the package, the test time, etc.). Alternatively, ICs can be produced with mask programmable IDs or one-time programmable (OTP) IDs. However, these solutions can increase the cost of production, including marketing, logistics, testing, production, etc. Other solutions include a fixed internal address setting, which can eliminate the need for dedicated address pins. However, in the case of an address collision, the fixed internal address setting may not be changed.

OVERVIEW

This document discusses, among other things, a multi-address Inter-Integrated Circuit ($I^2C$) selection circuit configured to determine one of 4 to the power of N ($4^N$) selectable $I^2C$ addresses using a number (N) of identification (ID) signals. For example, the multi-address $I^2C$ selection circuit can be configured to determine one of 4 selectable $I^2C$ addresses using a single ID pin, or one of 16 selectable $I^2C$ addresses using two ID pins, etc. The multi-address $I^2C$ selection circuit can receive the number (N) of identification (ID) signals from a corresponding number (N) of ID pins of a slave $I^2C$ device and at least one of a data signal from a serial data line (SDA) of an $I^2C$ bus or a clock signal from a serial clock line (SCL) of the $I^2C$ bus. The multi-address $I^2C$ selection circuit can be configured to determine one of 4 to the power of N ($4^N$) selectable $I^2C$ addresses using the number (N) of ID signals and at least one of the data signal or the clock signal.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, systems and methods to avoid $I^2C$ address collision by providing, for example, a choice of up to four selectable addresses using a single selection identification (ID) pin (PIN). In an example, using the single selection pin for the up to four-addresses can provide a low cost solution without an extra metal or OTP mask during production. Moreover, the techniques presented herein can be expanded to multiple selection pins, where any number of pins (N) can provide $4^N$ selectable addresses. For example, a single selection pin can provide up to four ($4^1$) selectable addresses, two selection pins can provide up to sixteen ($4^2$) selectable addresses, etc.

Figure 1:
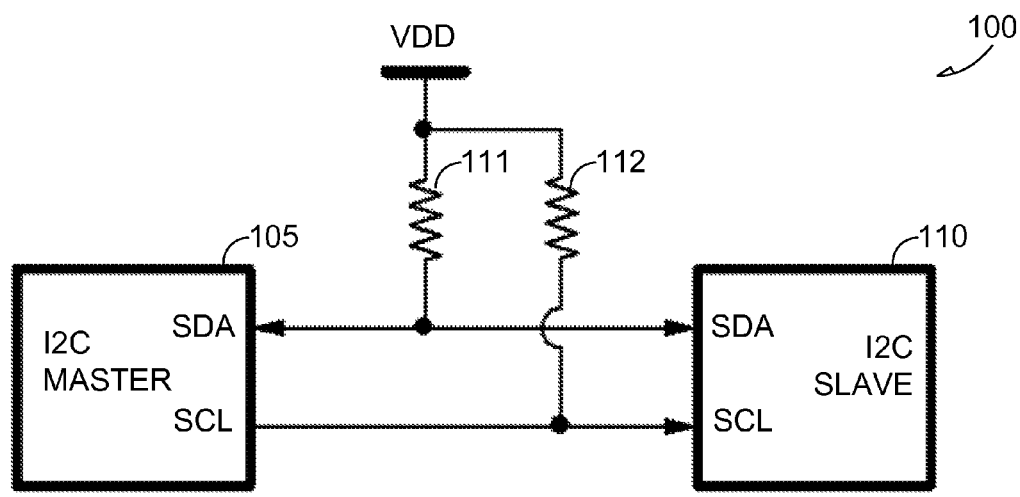
FIG. 1 illustrates generally an example Inter-Integrated Circuit ($I^2C$) system.
Figure 3:
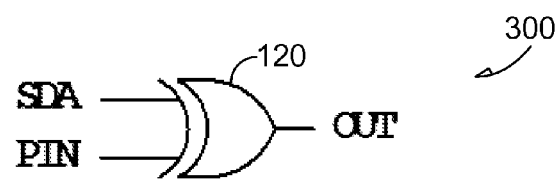
FIG. 3 illustrates generally an example portion of an address selection circuit including a XOR gate.
Figure 2:
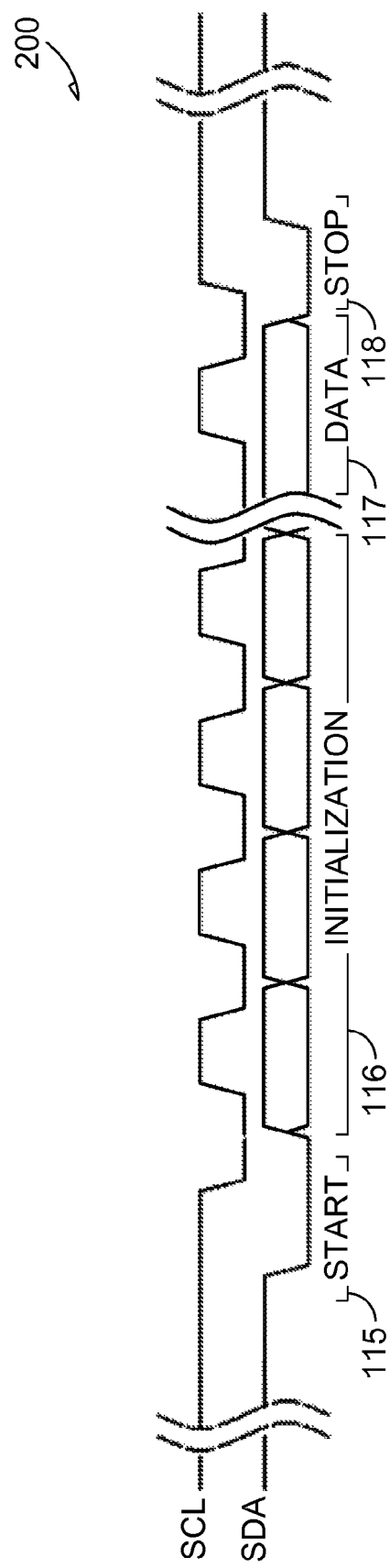
FIG. 2 illustrates generally an example Inter-Integrated Circuit ($I^2C$) transaction sequence.

FIG. 3 illustrates generally an example address selection circuit 300 including an exclusive OR (XOR) gate 120 configured to receive a serial data line (SDA) and a single selection identification (ID) pin (PIN) and to provide a detection output (OUT). Each I²C IC receives the following signals available externally: ground (GND), source voltage (VDD), serial data line (SDA), and serial clock line (SCL). In an example, address collision can be avoided by selectively coupling a signal to PIN, then detecting which signal is connected to PIN, for example, during an initialization phase. Although in this example the address selection circuit 300 includes the XOR gate 120, in other examples, the address selection circuit 300 can include one or more other logic gates or other circuits configured to detect which signal is connected to PIN.

The address selection circuit 300 conceptually provides a simple four I²C address selection implementation using a single selection pin (or $4^N$ address selection using N selection pins), and provides a small chip implementation area with no external components, negligible power consumption, and no temperature dependency. Moreover, the address selection circuit 300 provides access to four I²C slave addresses using the single selection pin (PIN), as illustrated in FIGS. 4-9, below, that does not depend on the amplitude of VDD. The concepts included herein with respect to a single selection pin can be applied to applications having a number (N) of selection pins providing access to $4^N$ slave addresses.

FIGS. 4-7 illustrate generally example detection configurations 400, 500, 600, 700, respectively, of an address selection circuit, such as the address selection circuit 300 illustrated in the example of FIG. 3, including relationships between signals on a serial clock line (SCL) 125, a serial data line (SDA) 126, a single selection pin (PIN) 127, and a detection pin (OUT) 128. In an example, the detection process can start and end during the first start bit generated by the I²C master device after a power-on reset (POR), and the result can be locked or stored in one or more flip flops until power down.

Figure 4:
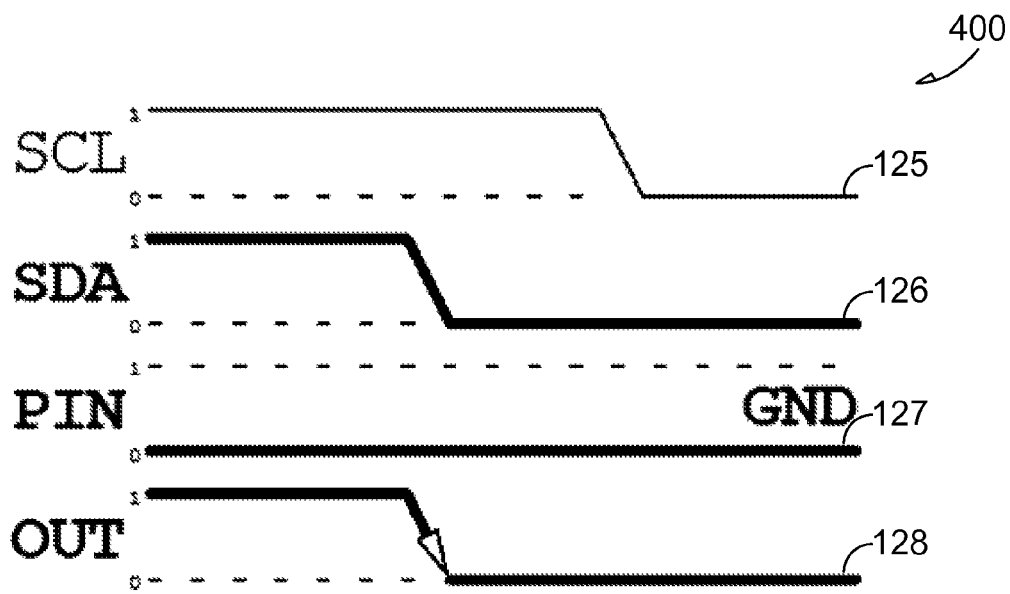
FIGS. 4-7 illustrate generally example detection configurations of an address selection circuit.

FIG. 4 illustrates generally a detection configuration 400 providing a single falling edge at the detection pin (OUT) 128 of the address selection circuit during the start bit as the single selection pin (PIN) 127 receives ground (GND).

Figure 5:
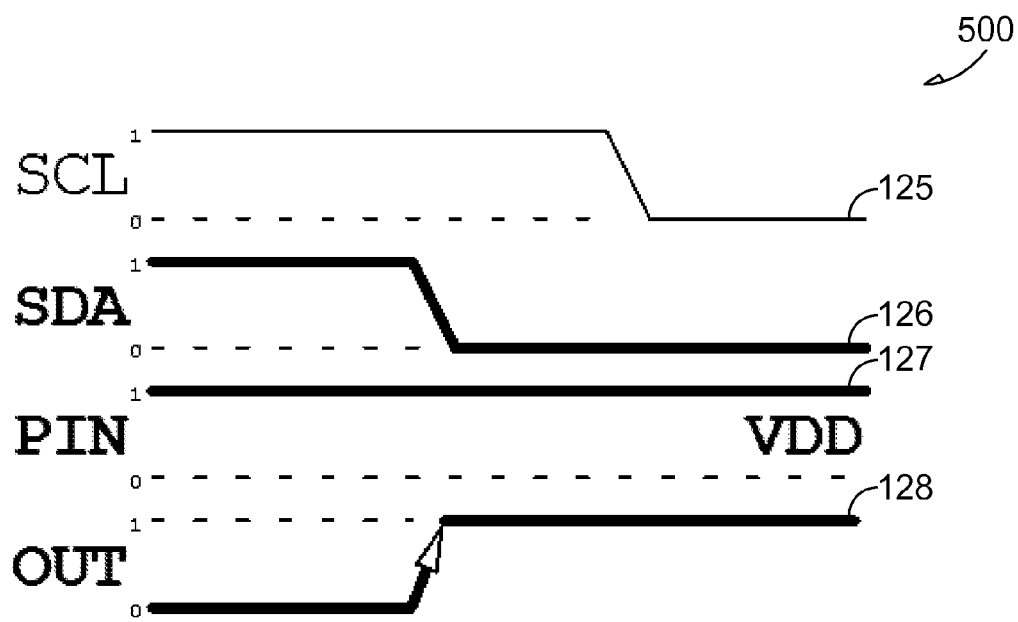

FIG. 5 illustrates generally a detection configuration 500 providing a single rising edge at OUT 128 of the address selection circuit during the start bit as PIN 127 receives a source voltage (VDD).

Figure 6:
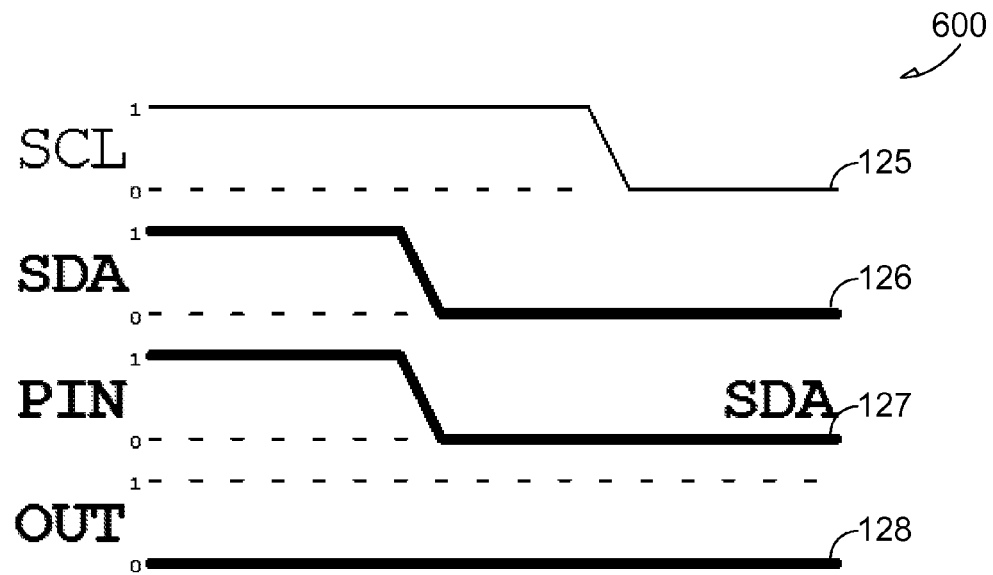

FIG. 6 illustrates generally a detection configuration 600 providing no edge (e.g., in this example, a low signal) at OUT 128 of the address selection circuit during the start bit as the PIN 127 receives the serial data line (SDA).

Figure 7:
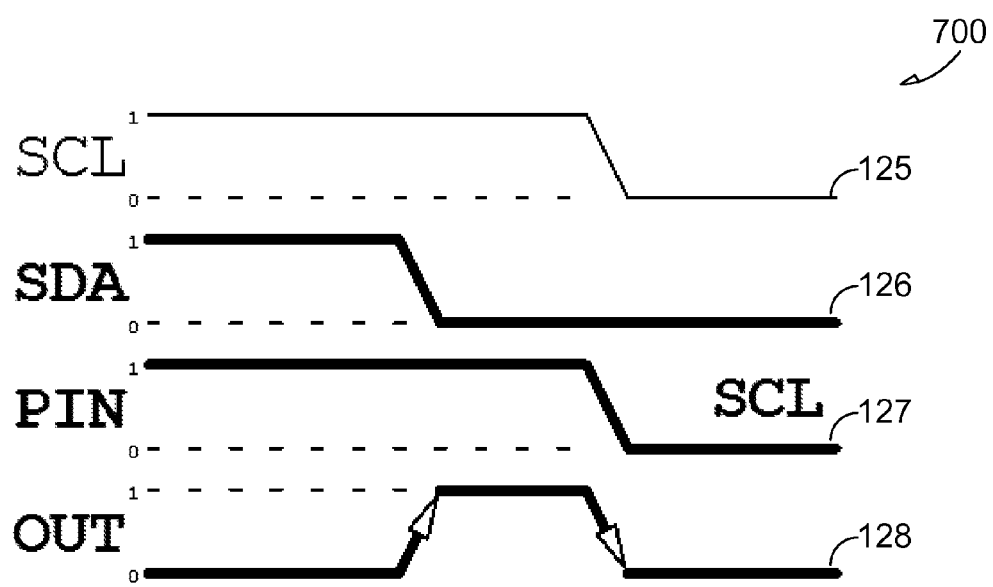

FIG. 7 illustrates generally a detection configuration 700 providing two edges (e.g., in this example, a rising and a falling edge) at OUT 128 of the address selection circuit during the start bit as PIN 127 receives the serial clock line (SCL).

Although the examples of FIGS. 4-7 are illustrated with respect to the logic illustrated in FIG. 3, other logic can be used to provide different output at OUT without deviating from the subject matter disclosed herein. Further, although FIGS. 4-7 illustrate generally examples where the logic illustrated in FIG. 3 receives PIN and SDA, the subject matter disclosed herein can be expanded to examples where the logic illustrated in FIG. 3 or other logic can receive PIN and SCL instead of PIN and SDA.

Figure 8:
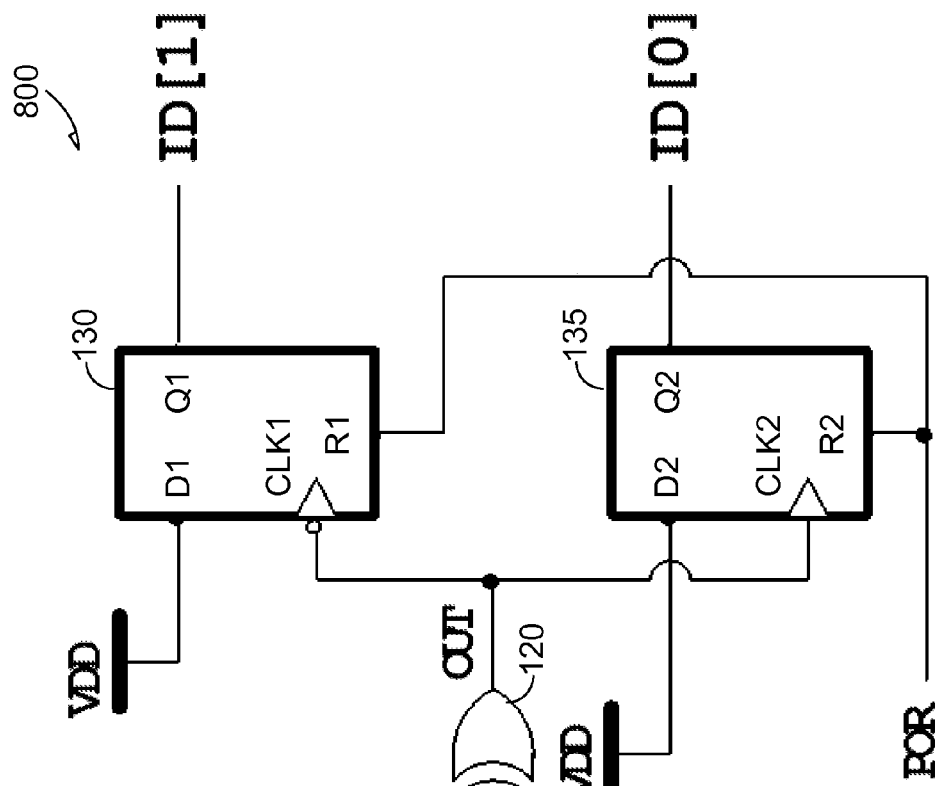
FIGS. 8-9 illustrate generally example four-address selection circuits using a single selection pin.

FIG. 8 illustrates generally an example four-address selection circuit 800 including an exclusive OR (XOR) gate 120 and first and second flip-flops 130, 135 (e.g., D flip-flops, etc.). The XOR gate 120 can be configured to receive a serial data line (SDA) and a single selection pin (PIN) and to provide a detection output (OUT) that can be received at the first and second flip-flops 130, 135. In an example, the first flip-flop 130 can include a falling edge flip-flop (e.g., triggered on a falling edge) and the second flip-flop 135 can include a rising edge flip-flop (e.g., triggered on a rising edge), respectively, and each can be configured to receive a source voltage (VDD) at a data input (D1, D2), OUT at a clock input (CLK1, CLK2), and a power-on reset (POR) at a reset input (R1, R2), and to provide an output (ID[1] and ID[0], respectively) at a data output (Q1, Q2).

In an example, the initial values of the output (ID[1], ID[0]) of the first and second flip-flops 130, 135 can be set to "00" (e.g., ID[1:0]=00). In an example, the output of the first and second flip-flops 130, 135 can operate, with reference to a rising and falling edges on OUT, as illustrated in Table 1 below.

TABLE 1

| OUT | | |
|---|---|---|
| Rising | Falling | ID[1:0] |
| Yes | No | 01 |
| No | Yes | 10 |
| Yes | Yes | 11 |
| No | No | 00 |

However, in the address selection circuit 800 of FIG. 8, any glitch on OUT can change the output of the first and second flip-flops 130, 135. Accordingly, one or more devices or circuits can be added to the address selection circuit 800 to address the effects of a glitch on OUT, such as that illustrated in FIG. 9 and described below.

Figure 9:
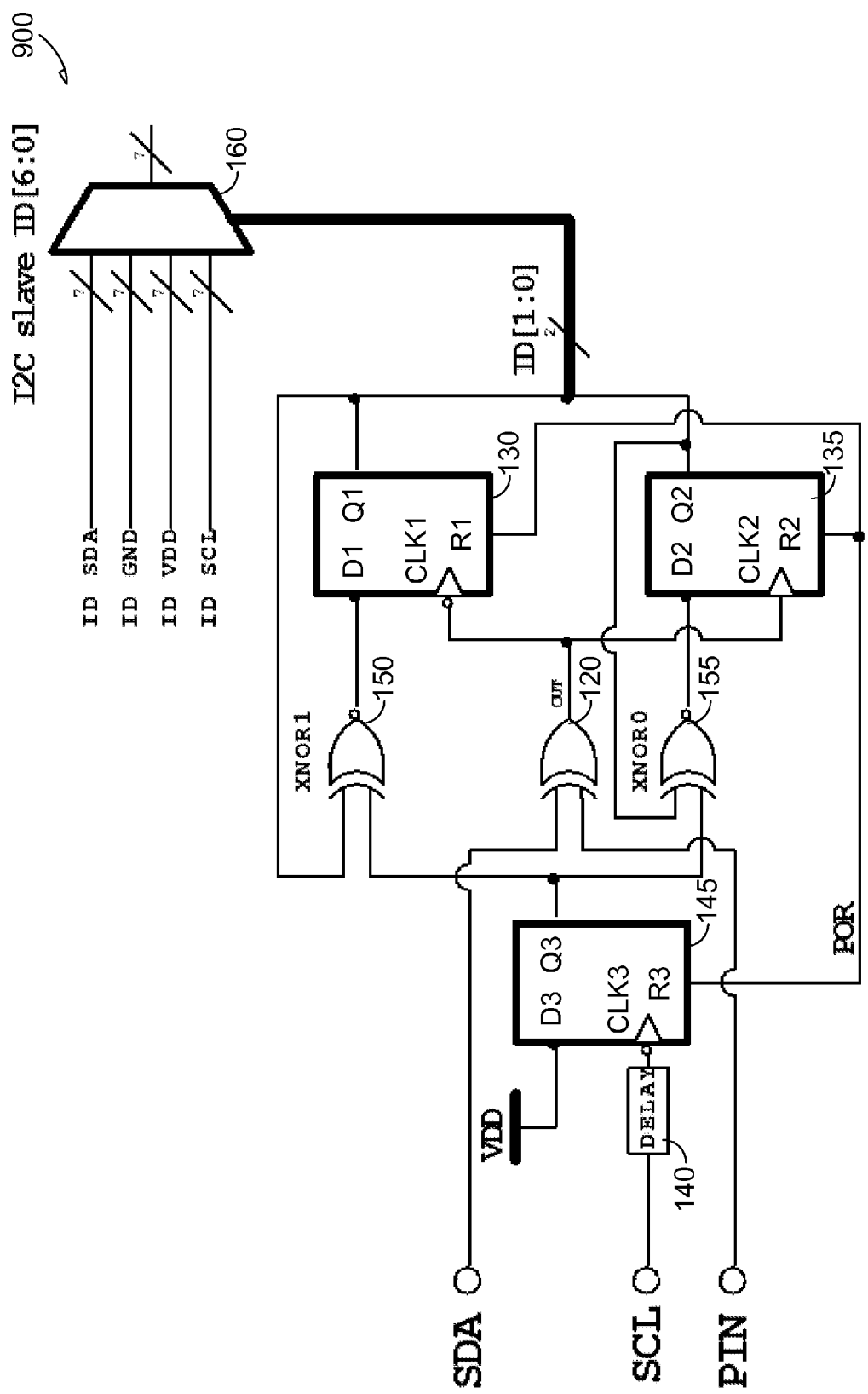

FIG. 9 illustrates generally an example four-address selection circuit 900 including a first exclusive OR (XOR) gate 120, first and second flip-flops 130, 135 (e.g., D flip-flops, etc.), a delay block 140, a third flip-flop 145 (e.g., a D flip-flop, etc.), first and second XNOR gates 150, 155, and a multiplexer (MUX) 160. The address selection circuit 900 can be configured to address the effects of a glitch on OUT, for example, using the third flip-flop 145 and the second and third XNOR gates 150, 155. The first flip-flop 130 can include a falling edge flip-flop (e.g., triggered on a falling edge), the second flip-flop 135 can include a rising edge flip-flop (e.g., triggered on a rising edge), and the third flip-flop 145 can include a falling edge flip-flop (e.g., triggered on a falling edge), respectively.

In an example, the third flip-flop 145 can be configured to receive a source voltage (VDD) at a data input (D3), a serial clock line (SCL) through a delay block 140 at a clock input (CLK3), and a power-on reset (POR) at a reset input (R3), and to provide an output of the third flip-flop 145 at a data output (Q3). In an example, to prevent a possible race condition, the delay block 140 can be selected to provide a delay from 3 to 5 times the magnitude of a gate delay. In other examples, one or more other delay periods can be chosen. This delay can be critical, for example, when SCL is connected to a single selection pin (PIN), and in certain examples, is critical only when the SCL is connected to the PIN.

In an example, the first XNOR gate 150 can be configured to receive the output of the third flip-flop 145, to receive the output of the first flip-flop 130, and to provide an output to the data input (D1) of the first flip-flop 130, and the second XNOR gate 155 can be configured to receive the output of the third flip-flop 145, to receive the output of the second flip-flop 135, and to provide an output to the data input (D2) of the second flip-flop 135, effectively locking the output of the first and second flip-flops 130, 135.

For example, an example sequence of events can include:
(1) (E.g., after POR) Q1=0, Q2=0, Q3=0.
(2) D1=1, D2=1, D3=1 (e.g., D3=VDD).
(3) After first falling edge of a serial data line (SDA), a rising edge, a falling edge, or no edge is created on a detection output (OUT).
(4) After a first falling edge has occurred on OUT, Q1 changes from 0 to 1 and D1 changes from 1 to 0. Here, Q2, D2, Q3, and D3 are not affected.
(5) The falling edge of SCL ends the detection process. Q3 changes from 0 to 1, which locks Q1 to 1 and Q2 to 0. In this example, the first, second, and third flip-flops 130, 135, 145 are locked until the next POR event.
(6) The values of the output (ID[1], ID[0]) of the first and second flip-flops 130, 135 controls the MUX 160, which can select an appropriate I²C slave ID.

In other examples, similar processes can be used to describe other cases (e.g., a rising edge, no edge, or a rising and a falling edge on OUT, etc.).

Figure 10:
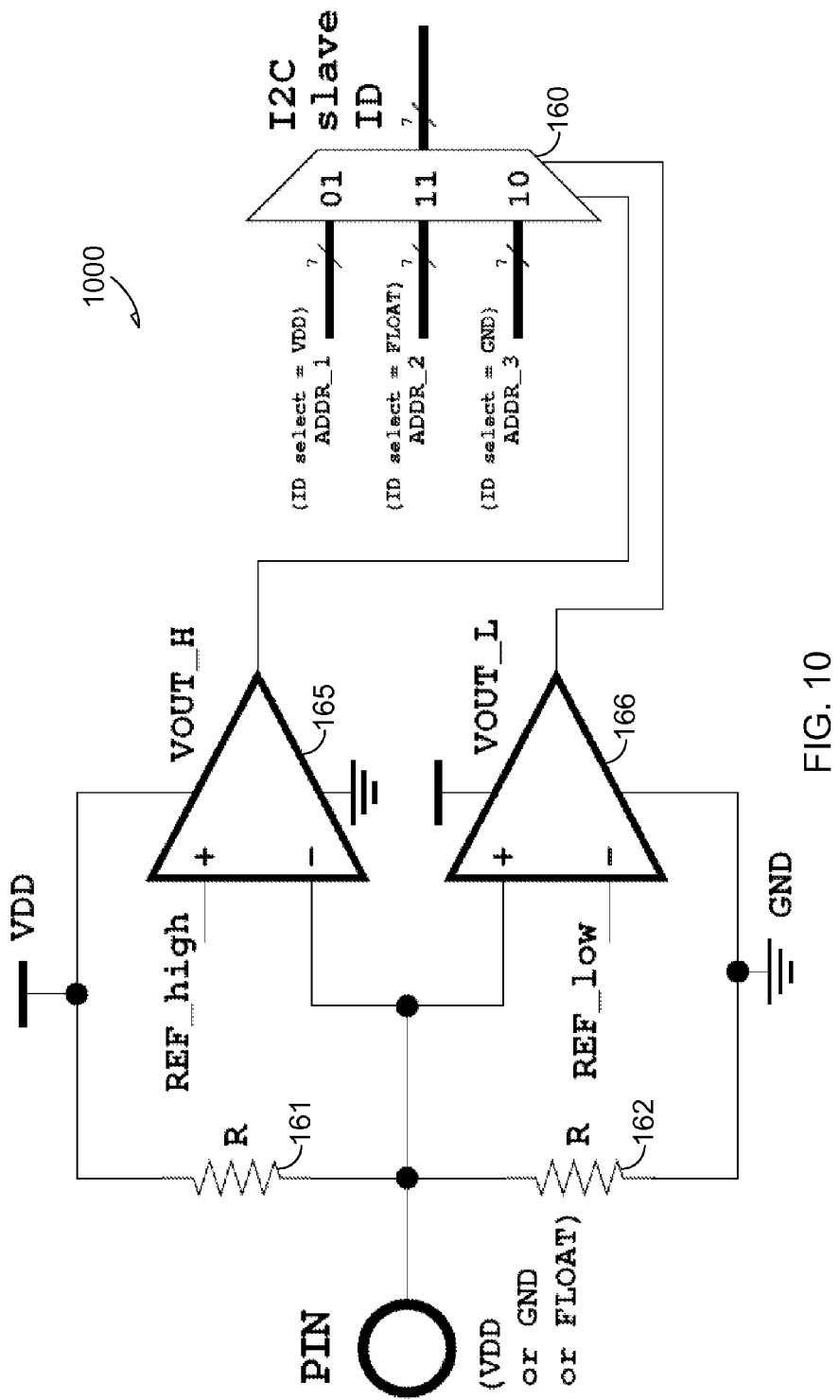
FIGS. 10-11 illustrate generally example three-address selection circuits using a single selection pin.

FIG. 10 illustrates generally example three-address selection circuit 1000 including first and second comparators 165, 166 and a multiplexer (MUX) 160. The first and second comparators 165, 166 can be configured to receive a voltage from a single selection pin (PIN) and compare the received voltage at the PIN to respective high and low reference voltages (REF_high, REF_low, respectively). In this example, the PIN can receive three inputs: a source voltage (VDD) (high), a ground (GND) (low), or a float (float). The PIN can be tied between a source voltage (VDD) and ground (GND) through resistors 161, 162, such that when the input to the PIN is a float value, the voltage at the PIN can be set using the resistors 161, 162, and not float to a high or low value (e.g., a value above the high reference voltage or below the low reference voltage). The output of the first and second comparators 165, 166 can be provided to the MUX 160, and the MUX 160 can be configured to select an appropriate I²C slave ID using the output of the first and second comparators 165, 166.

Figure 11:
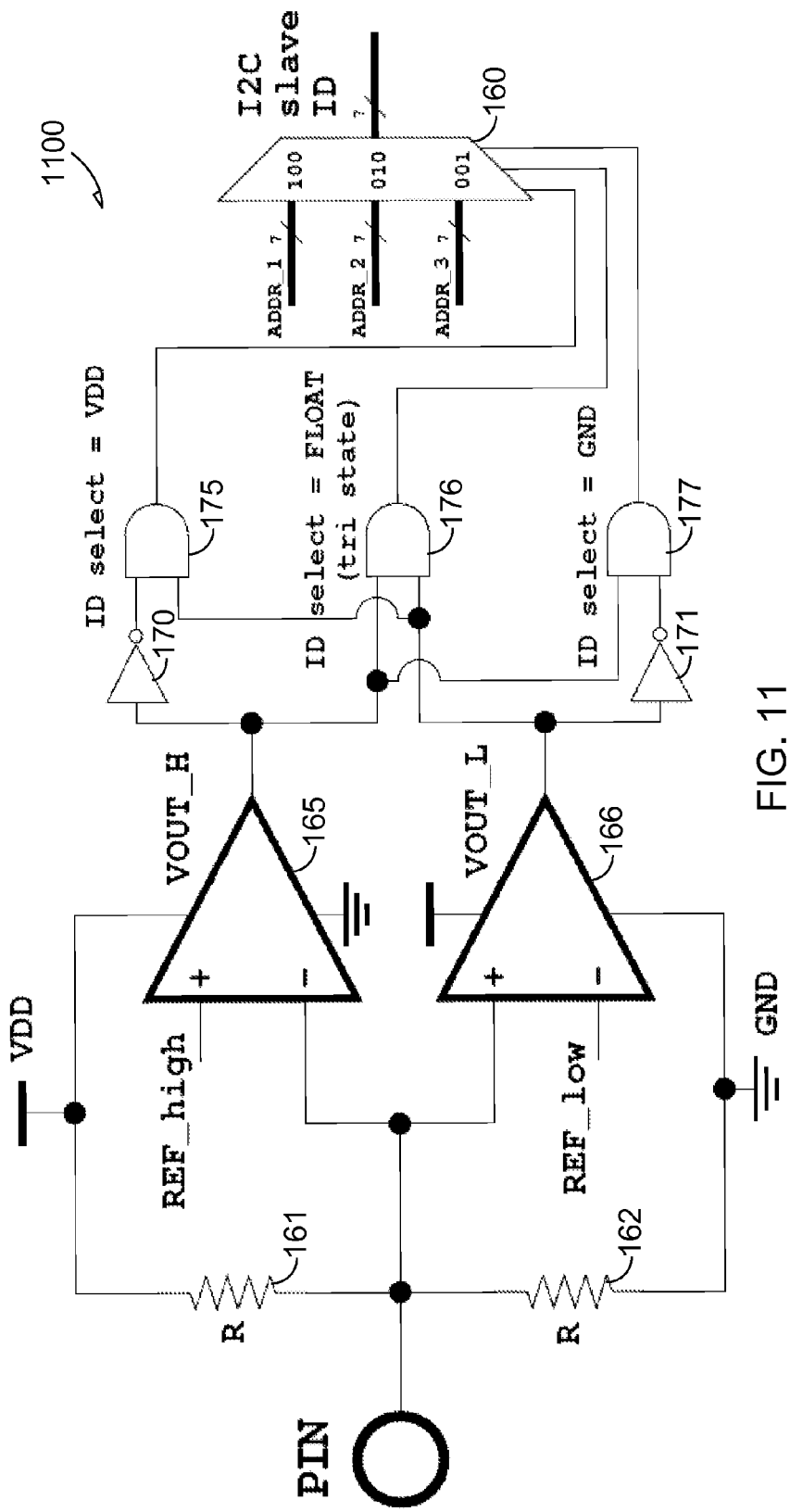

FIG. 11 illustrates generally example three-address selection circuit 1100 including first and second comparators 165, 166, first and second inverters 170, 171, first, second, and third AND gates 175, 176, 177, and a multiplexer (MUX) 160. In other examples, other logic gates can be used to condition the output of the first and second comparators 165, 166 for receipt by the MUX 160.

Although the address selection circuits of FIGS. 10-11 are slightly more complex than the address selection circuits of FIGS. 3-9, they still provide multiple I²C address selection (here, three I²C slave addresses using the single selection pin (PIN)) implementations using a single selection pin and a small chip implementation area with no external components. However, in contrast to the address selection circuits of FIGS. 3-9, the three-address selection circuits 1000, 1100 include first and second comparators 165, 166 (e.g., analog comparators) that consume power and, along with the high and low reference voltages, are temperature dependent, and the output of the first and second comparators 165, 166 can depend on the value of VDD.

Figure 12:
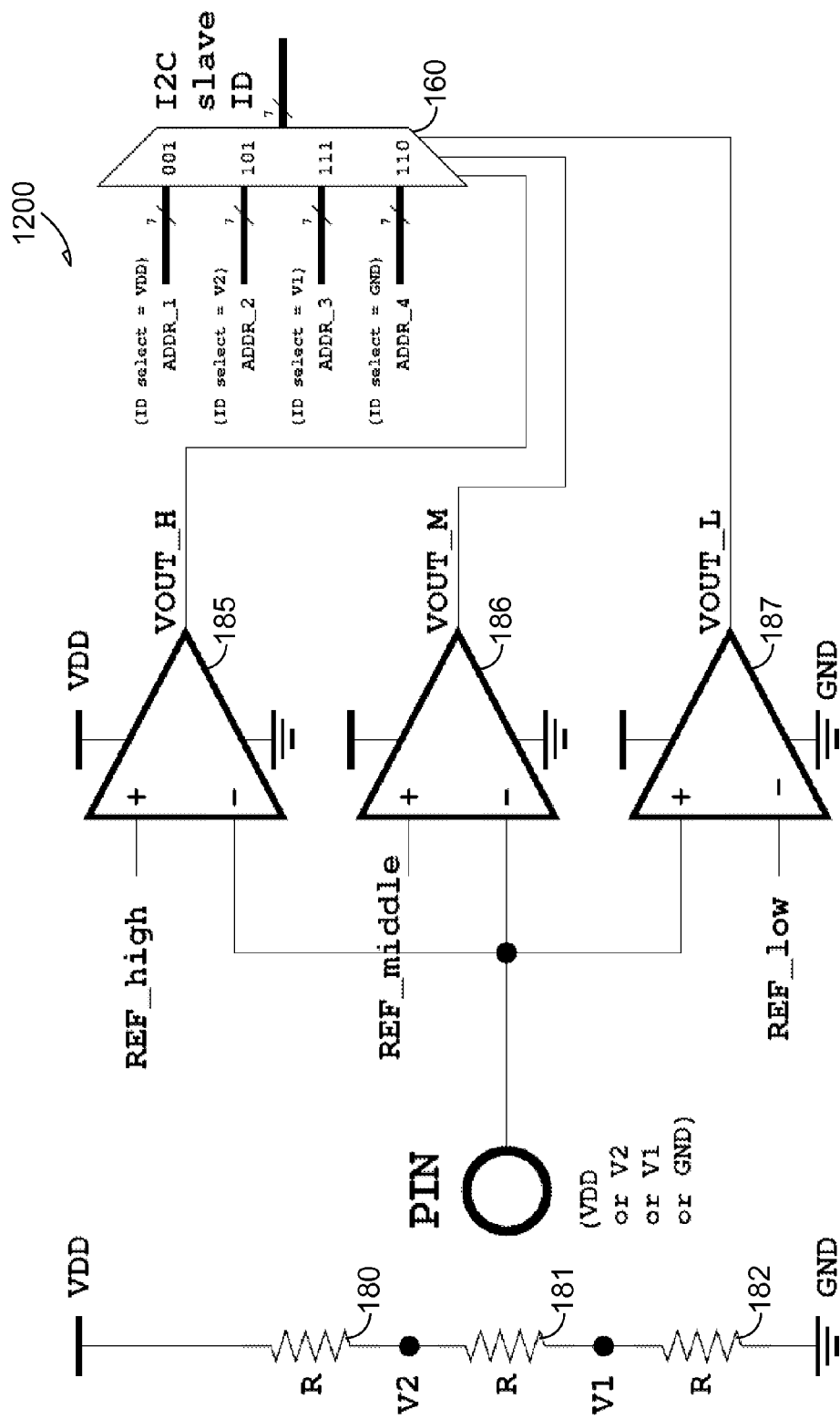
FIGS. 12-13 illustrate generally example four-address selection circuits using a single selection pin.

FIG. 12 illustrates generally example four-address selection circuit 1200 including first, second, and third comparators 185, 186, 187 and a multiplexer (MUX) 160. The first, second, and third comparators 185, 186, 187 can be configured to receive a voltage from a single selection pin (PIN) and compare the received voltage at the PIN to respective high, medium, and low reference voltages (REF_high, REF_middle, REF_low, respectively). In this example, the PIN can receive four inputs: a source voltage (VDD) (high), a high input voltage (V2), a low input voltage (V1), and a ground (GND) (low). The high input voltage (V2) and the low input voltage (V1) can be set off-chip between VDD and GND using first, second, and third resistors 180, 181, 182. The output of the first, second, and third comparators 185, 186, 187 can be provided to the MUX 160, and the MUX 160 can be configured to select an appropriate I²C slave ID using the output of the first, second, and third comparators 185, 186, 187. Although the four-address selection circuit 1200 is slightly more complex than the three-address selection circuits 1000, 1100, and in certain examples requires external components (e.g., the first, second, and third resistors 180, 181, 182), it does provide four I²C slave addresses instead of three.

Figure 13:
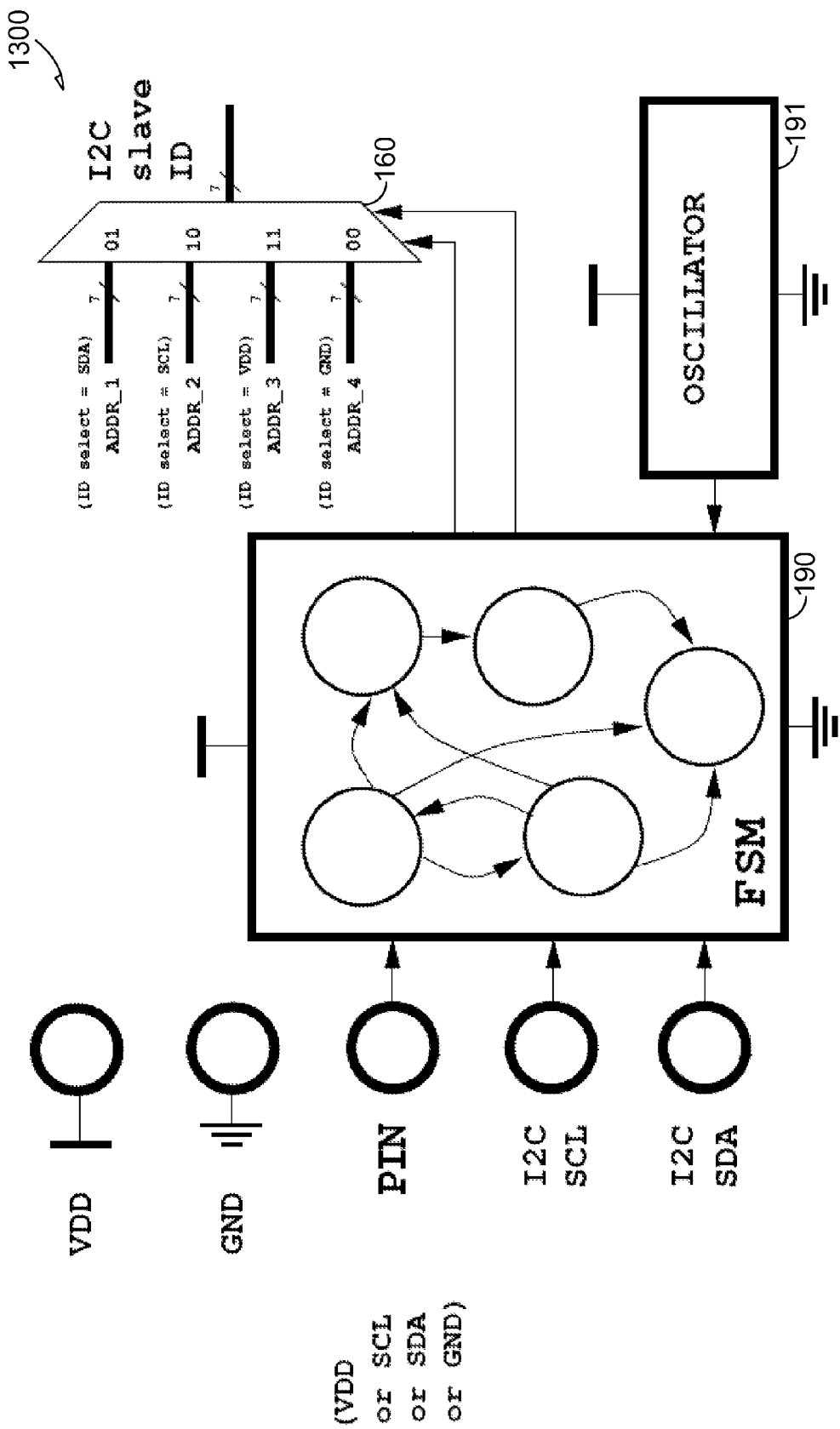

FIG. 13 illustrates generally example four-address selection circuit 1300 including a finite state machine (FSM) 190, an oscillator 191, and a multiplexer (MUX) 160. The FSM 190 can be configured to receive an input from a single selection pin (PIN), a serial data line (SDA), and a serial clock line (SCL). The FSM 190 can provide one or more outputs to the MUX 160, and the MUX 160 can be configured to select an appropriate I²C slave ID using the outputs of the MUX 160. In other examples, the four-address selection circuit 1300 can include a microcontroller (μC) or other controller instead of the FSM 190.

Although the four-address selection circuit 1300 is not temperature dependent and does not depend on the amplitude of the source voltage (VDD) or require any external components, the power consumption is relatively moderate due to the oscillator 191. Further, after the appropriate I²C slave ID is detected, the oscillator 191 can be turned off, reducing power consumption during operation.

Additional Notes and Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system, comprising:
    a multi-address Inter-Integrated Circuit ($I^2C$) selection circuit configured to receive:
        two identification (ID) signals from two corresponding ID pins of a slave $I^2C$ device; and
        at least one of a data signal from a serial data line (SDA) of an $I^2C$ bus or a clock signal from a serial clock line (SCL) of the $I^2C$ bus,
    wherein the multi-address $I^2C$ selection circuit is configured to determine one of 16 selectable $I^2C$ addresses using the ID signals and at least one of the data signal or the clock signal.

2. The system of claim 1, wherein the multi-address $I^2C$ selection circuit is configured to determine one of 16 selectable $I^2C$ addresses using the two ID signals and the data signal.

3. The system of claim 1, wherein the multi-address $I^2C$ selection circuit is configured to determine one of 16 selectable $I^2C$ addresses using the two ID signals and the clock signal.

4. The system of claim 1, including the slave $I^2C$ device, wherein the slave $I^2C$ device includes:
    a serial data line (SDA) pin configured to receive a data signal from the $I^2C$ bus;
    a serial clock line (SCL) pin configured to receive a clock signal from the $I^2C$ bus;
    a source voltage (VDD) pin configured to receive VDD;
    a ground (GND) pin configured to receive GND; and
    a number (N) of identification (ID) pins configured to receive a corresponding number (N) of selectable ID signals, and
    wherein the slave $I^2C$ device includes the multi-address $I^2C$ selection circuit.

5. The system of claim 4, including a master $I^2C$ device configured to drive the clock signal on the $I^2C$ bus and to communicate with the slave $I^2C$ device.

6. A method, comprising:
    receiving two identification (ID) signals from two corresponding ID pins of a slave $I^2C$ device;
    receiving at least one of a data signal from a serial data line (SDA) of an $I^2C$ bus or a clock signal from a serial clock line (SCL) of the $I^2C$ bus; and
    determining one of 16 selectable $I^2C$ addresses using the ID signals and at least one of the data signal or the clock signal.

7. The method of claim 6, wherein the determining one of 16 selectable $I^2C$ addresses includes using the signals and the data signal.

8. The method of claim 6, wherein the determining one of 16 selectable $I^2C$ addresses includes using the ID signals and the clock signal.

9. A system, comprising:
    a slave $I^2C$ device including a multi-address Inter-Integrated Circuit ($I^2C$) selection circuit, the multi-address Inter-Integrated Circuit ($I^2C$) selection circuit configured to receive:
        a singly identification (ID) signal from a single ID pin of the slave $I^2C$ device; and
        at least one of a data signal from a serial data line (SDA) of an $I^2C$ bus or a clock signal from a serial clock line (SCL) of the $I^2C$ bus,
    wherein the multi-address $I^2C$ selection circuit is configured to determine one of 4 selectable $I^2C$ addresses using the single ID signal and at least one of the data signal or the clock signal,
    wherein the slave $I^2C$ device includes:
        a serial data line (SDA) pin configured to receive a data signal from the $I^2C$ bus;
        a serial clock line (SCL) pin configured to receive a clock signal from the $I^2C$ bus;
        a source voltage (VDD) pin configured to receive VDD;
        a ground (GND) pin configured to receive GND; and
        a number (N) of identification (ID) pins configured to receive a corresponding number (N) of selectable ID signals, and wherein the multi-address I²C selection circuit includes:
- a logic gate configured to receive the single ID signal and the data signal and to provide a detection output (OUT); and
- a flip-flop configured to retain the state of the detection OUT, wherein the logic gate includes an exclusive OR (XOR) gate, wherein the flip-flop includes:
- a rising edge flip-flop configured to detect and retain a rising edge on the detection OUT; and
- a falling edge flip-flop configured to detect and retain a falling edge on the detection OUT, and wherein the multi-address I²C selection circuit is configured to determine the selectable I²C address using the output of the rising and falling edge flip-flops.

10. The system of claim 9, wherein the multi-address I²C selection circuit is configured to determine one of 4 selectable I²C addresses using the single ID signal and the data signal.

11. The system of claim 9, wherein the multi-address I²C selection circuit is configured to determine one of 4 selectable I²C addresses using the single ID signal and the clock signal.

12. The system of claim 9, including a master I²C device configured to drive the clock signal on the I²C bus and to communicate with the slave I²C device.

13. The system of claim 9, wherein the multi-address I²C selection circuit is configured to determine a first address if the single ID pin of the slave I²C receives VDD,
- wherein the multi-address I²C selection circuit is configured to determine a second address if the single ID pin of the slave I²C receives GND,
- wherein the multi-address I²C selection circuit is configured to determine a third address if the single ID pin of the slave I²C receives the data signal, and
- wherein the multi-address I²C selection circuit is configured to determine a fourth address if the single ID pin of the slave I²C receives the clock signal.

* * * * *